United States Patent
Hasan et al.

(10) Patent No.: US 12,541,650 B2
(45) Date of Patent: Feb. 3, 2026

(54) METHOD AND SYSTEM FOR TRAINING A VIRTUAL AGENT USING OPTIMAL UTTERANCES

(71) Applicants: Asif Hasan, Marlborough, MA (US); Gaurav Johar, Toronto (CA); Kanishk Mehta, Toronto (CA); Sreevasthavan K C, Mumbai (IN); Akash Mourya, Mumbai (IN); Himanshu Kumar, Mumbai (IN); Surya S G, Mumbai (IN); Harshit Shah, Mumbai (IN); Ashwini Patil, Mumbai (IN); Saravanan Murugan, Mumbai (IN); Anuja Anil Kumar Singh, Mumbai (IN); Tridib Paul, Mumbai (IN)

(72) Inventors: Asif Hasan, Marlborough, MA (US); Gaurav Johar, Toronto (CA); Kanishk Mehta, Toronto (CA); Sreevasthavan K C, Mumbai (IN); Akash Mourya, Mumbai (IN); Himanshu Kumar, Mumbai (IN); Surya S G, Mumbai (IN); Harshit Shah, Mumbai (IN); Ashwini Patil, Mumbai (IN); Saravanan Murugan, Mumbai (IN); Anuja Anil Kumar Singh, Mumbai (IN); Tridib Paul, Mumbai (IN)

(73) Assignee: QUANTIPHI, INC., Marlborough, MA (US)

( * ) Notice: Subject to any disclaimer, the term of this patent is extended or adjusted under 35 U.S.C. 154(b) by 253 days.

(21) Appl. No.: 18/215,509

(22) Filed: Jun. 28, 2023

(65) Prior Publication Data
US 2023/0342557 A1 Oct. 26, 2023

(51) Int. Cl.
G06F 17/27 (2006.01)
G06F 40/35 (2020.01)
G06N 3/006 (2023.01)

(52) U.S. Cl.
CPC .............. *G06F 40/35* (2020.01); *G06N 3/006* (2013.01)

(58) Field of Classification Search
CPC ...... G06F 40/35; G06F 40/279; G06F 40/166; G06F 40/30
(Continued)

(56) References Cited

U.S. PATENT DOCUMENTS 11,487,945 B2 11/2022 Sapugay et al.
11,562,267 B2 1/2023 Polleri et al.
(Continued)

OTHER PUBLICATIONS

Boris Galitsky,"Assuring Chatbot Relevance at Syntactic Level", available at <https://link.springer.com/chapter/10.1007/978-3-030-04299-8_5> Apr. 2019, 42 pages.

*Primary Examiner* — Md S Elahee
(74) *Attorney, Agent, or Firm* — D'Ambrosio & Menon, PLLC; Usha Menon

(57) ABSTRACT

A method and system for training a virtual agent is provided herein. The method and system comprises storing conversations between the virtual agent and a user in logs. The method and system further comprises mining the logs to retrieve utterances. The method and system further comprises computing regression for each of the plurality of the charging time segments. The method and system further comprises providing a score to the utterances. Further, the method ranking the utterances based on the score.

17 Claims, 11 Drawing Sheets

(58) Field of Classification Search
USPC .............................................................. 704/9
See application file for complete search history.

(56) References Cited

U.S. PATENT DOCUMENTS

| | | | |
|---|---|---|---|
| 11,797,768 B2* | 10/2023 | Topol | .................. G06F 16/3344 |
| 2020/0125928 A1* | 4/2020 | Doyle | ..................... G06F 40/30 |
| 2021/0350263 A1 | 11/2021 | Koneru et al. | |
| 2023/0045930 A1 | 2/2023 | Can et al. | |
| 2023/0315998 A1* | 10/2023 | Sundaram | ............... G06F 40/35 |
| | | | 704/9 |
| 2024/0386189 A1* | 11/2024 | Malladi | ................ G06F 40/166 |

* cited by examiner

METHOD AND SYSTEM FOR TRAINING A VIRTUAL AGENT USING OPTIMAL UTTERANCES

TECHNICAL FIELD OF THE INVENTION

The present disclosure is related to method and system for training a virtual agent. More specifically, the disclosure relates to extracting and suggesting optimal utterances for training a virtual agent.

BACKGROUND OF THE INVENTION

A virtual agent refers to an interactive software program or system that simulates human-like conversations or interactions using artificial intelligence (AI) techniques. The virtual agent is designed to communicate with users in a natural language format, typically through text-based chat interfaces or voice-based interactions. The virtual agent is capable of understanding user queries or requests, interpreting the context, and providing appropriate responses or actions.

The virtual agent's functionality is based on advanced algorithms and AI models, which enables processing and analyzing user input, extracting relevant information, and generating meaningful and contextually appropriate responses. The virtual agent may utilize various techniques such as natural language processing (NLP), machine learning, pattern recognition, and knowledge representation to achieve accurate understanding and effective communication with users.

The virtual agent's capabilities may include but are not limited to:

Natural Language Understanding (NLU): The virtual agent is equipped with NLU algorithms to comprehend user intents, extract key information, and identify the context of the conversation.

Contextual Understanding: The virtual agent is capable of maintaining contextual awareness throughout the conversation, ensuring that responses are relevant and coherent within the ongoing dialogue.

Dialogue Management: The virtual agent utilizes sophisticated dialogue management techniques to maintain a coherent and engaging conversation flow, handling multiple turns and managing user expectations.

Knowledge Base Integration: The virtual agent can access and integrate with a knowledge base or database containing relevant information to provide accurate and up-to-date responses to user inquiries.

Personalization: The virtual agent may employ user profiling techniques to tailor responses based on individual preferences, past interactions, or demographic information.

Task Execution: The virtual agent may perform various tasks or actions on behalf of the user, such as retrieving information from external sources, making reservations, or initiating specific processes.

Training a virtual agent is highly significant because it allows the agent to acquire the necessary knowledge, skills, and understanding to effectively interact with users. Through training, the virtual agent gains the ability to comprehend user input, interpret the context accurately, and generate appropriate responses or actions.

By undergoing training, the virtual agent becomes capable of processing vast amounts of data and information, learning patterns, and extracting meaningful insights. This training process equips the agent with the necessary algorithms, models, and techniques to analyze user queries, understand intents, and provide relevant and accurate assistance.

Training also enables the virtual agent to adapt and improve over time. Through continuous exposure to real-world user interactions, the agent can refine its understanding, fine-tune its responses, and enhance its overall performance. This iterative training process helps the virtual agent to better meet user expectations, deliver more personalized experiences, and address a broader range of user needs.

Moreover, training empowers the virtual agent to integrate with knowledge bases or databases, which further enhances virtual agent's knowledge and capabilities. By accessing and learning from relevant information sources, the virtual agent becomes better equipped to provide up-to-date and accurate responses, retrieve specific data, or execute complex tasks on behalf of the users.

In the current scenario training phrases are manually identified and used as an input to the virtual agent. Therefore, there is a pressing need that the training phrases identification process is automated.

It is within this context that the present embodiments arise.

SUMMARY

The following embodiments present a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

Some example embodiments disclosed herein provide a method for training a virtual agent, the method comprising storing conversations between the virtual agent and a user in logs. The method may further include mining the logs to retrieve utterances. The method may include providing a score to the utterances. The method may also include ranking the utterances based on the score.

According to some example embodiments, the score is calculated based on syntactic similarity.

According to some example embodiments, the score is calculated based on semantic similarity.

According to some example embodiments, the method further comprises calculating the semantic similarity using a deep learning model.

According to some example embodiments, the score is calculated based on word error rate According to some example embodiments, the score is calculated based on language code for a multilingual chat.

According to some example embodiments, the method further comprising extracting an optimal utterance based on the ranking the utterances.

According to some example embodiments, the optimal utterance is determined based on a threshold value of the score.

According to some example embodiments, the method further comprising training the virtual agent based on the optimal utterance.

Some example embodiments disclosed herein provide a computer system for training a virtual agent, the computer system comprises one or more computer processors, one or more computer readable memories, one or more computer readable storage devices, and program instructions stored on the one or more computer readable storage devices for execution by the one or more computer processors via the one or more computer readable memories, the program instructions comprising storing conversations between the virtual agent and a user in logs. The one or more processors are further configured to mining the logs to retrieve utterances. The one or more processors are configured to providing a score to the utterances. The one or more processors are further configured to ranking the utterances based on the score.

Some example embodiments disclosed herein provide a non-transitory computer readable medium having stored thereon computer executable instruction which when executed by one or more processors, cause the one or more processors to carry out operations for training a virtual agent. The operations comprising storing conversations between the virtual agent and a user in logs. The operations further comprising mining the logs to retrieve utterances. The operations further comprising providing a score to the utterances. The operations further ranking the utterances based on the score.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The above and still further example embodiments of the present disclosure will become apparent upon consideration of the following detailed description of embodiments thereof, especially when taken in conjunction with the accompanying drawings, and wherein.

Figure 1:
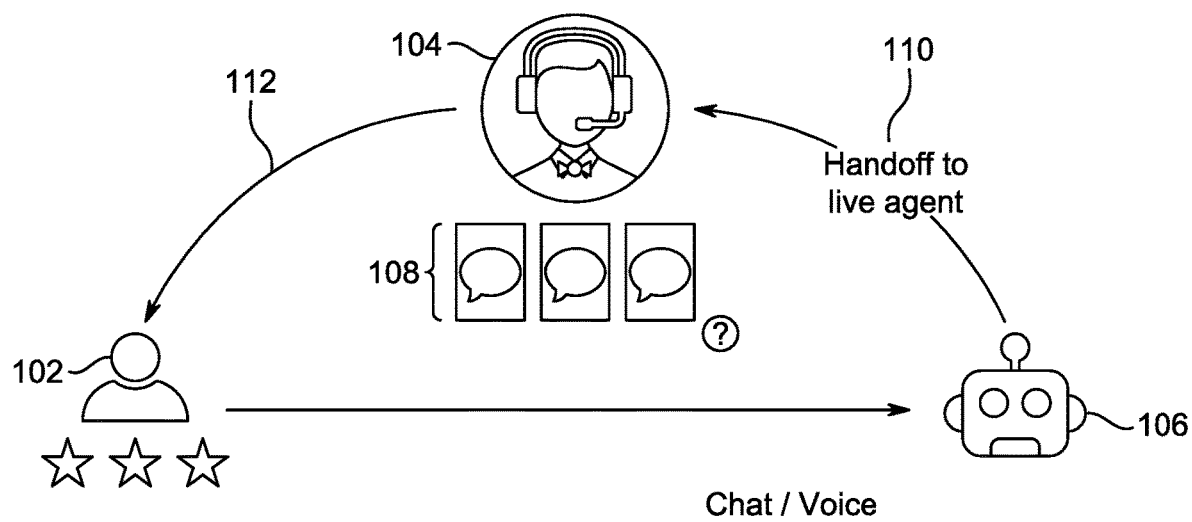
FIG. 1 illustrates a use case of a user interaction with a virtual agent and a human agent, in accordance with an example embodiment.

The figures illustrate embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present invention.

Reference in this specification to "one embodiment" or "an embodiment" or "example embodiment" means that a particular feature, structure, or characteristic described in connection with the embodiment is included in at least one embodiment of the present invention. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

The terms "comprise", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect.

Definitions

The term "module" used herein may refer to a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The term "machine learning model" may be used to refer to a computational or statistical or mathematical model that is trained on classical ML modelling techniques with or without classical image processing. The "machine learning model" is trained over a set of data and using an algorithm that it may use to learn from the dataset.

The term "artificial intelligence" may be used to refer to a model built using simple or complex Neural Networks using deep learning techniques and computer vision algorithms. Artificial intelligence model learns from the data and applies that learning to achieve specific pre-defined objectives.

End of Definitions

Embodiments of the present disclosure may provide a method, a system, and a computer program product for training a virtual agent. The method, the system, and the computer program product for training a virtual agent are described with reference to FIG. 1 to FIG. 10 as detailed below.

FIG. 1 illustrates a use case of a user interaction with a virtual agent and a human agent. In an embodiment, a user 102 strives to interact with a virtual agent 106 through a medium 108. In some embodiments the medium 108 may be a voice or text. The objective of the virtual agent 106 is to provide an experience to the user 102 which is as close as possible to a hypothetical human interaction.

However, there are circumstances where a virtual agent is unable to process the query of the user 102. In such cases the control is transferred to a human agent 104 for interacting with the user 102.

In an embodiment, a virtual agent may transfer a session to a human agent under various circumstances, depending on the capabilities and design of the specific system. Here are some common situations where such a transfer may occur:

Complex or Unresolved Queries: If the virtual agent encounters a query that cannot be sufficiently addressed, the virtual agent may transfer the session to a human agent. This can happen when dealing with highly technical or specialized questions, ambiguous queries, or situations requiring human judgment and expertise.

Emotional or Sensitive Interactions: Virtual agents may identify certain emotional or sensitive states in users, such as frustration, anger, or distress. In such cases, when empathy and emotional support are crucial, the virtual agent may decide to transfer the session to a human agent who is better equipped to handle these complex emotional interactions.

Specific User Requests: Users may explicitly request to speak with a human agent for various reasons. This could be due to personal preferences, the need for more personalized assistance, or a desire to discuss confidential or sensitive matters that require human intervention.

Escalation Process: Some virtual agent systems have escalation mechanisms in place to monitor the performance or effectiveness of the virtual agent. If the system detects a consistently low confidence level or a high rate of unsatisfactory responses, it may trigger an escalation to a human agent to ensure a higher level of customer satisfaction.

User Opt-In: In certain scenarios, users may be given the option to request a human agent during their interaction with the virtual agent. This could be part of the system's design to provide users with the flexibility to choose between automated assistance and human assistance, based on their specific needs or preferences.

System Limitations or Errors: If the virtual agent encounters technical issues, experiences system limitations, or encounters errors that prevent the virtual agent from functioning properly, the virtual agent may transfer the session to a human agent to ensure a seamless and uninterrupted user experience.

Figure 2:
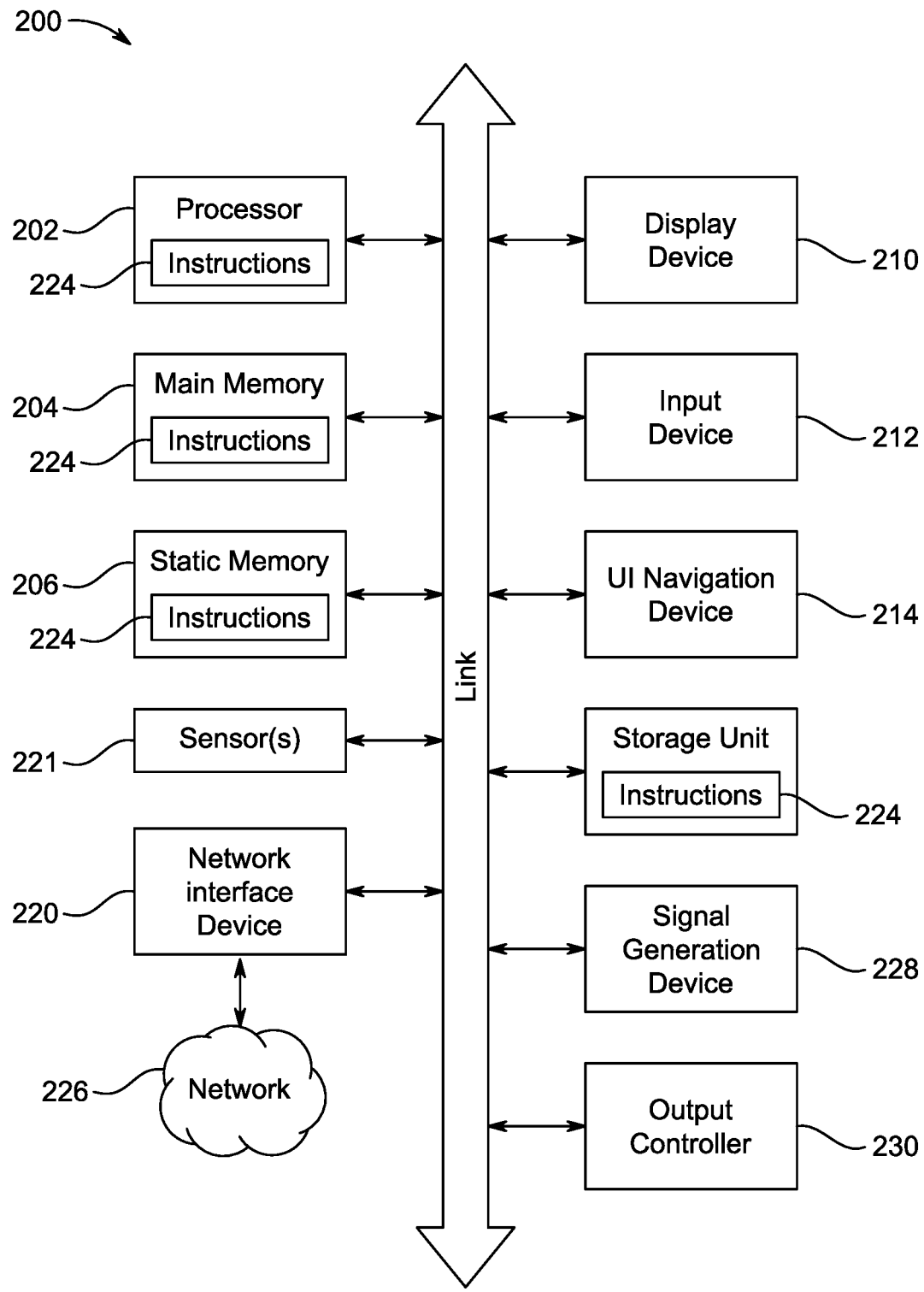
FIG. 2 illustrates a block diagram of an electronic circuitry for identifying optimal utterances for virtual agent training, in accordance with an example embodiment.

FIG. 2 illustrates a block diagram of an electronic circuitry for identifying optimal utterances for virtual agent training. The machine of FIG. 2 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 2 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 200 includes at least one processor 202 (e.g., a central processing unit (CPU), a graphics processing unit (GPU), advanced processing unit (APU), or combinations thereof), one or more memories such as a main memory 204, a static memory 206, or other types of memory, which communicate with each other via link 208. Link 208 may be a bus or other type of connection channel. The machine 200 may include further optional aspects such as a graphics display unit 210 comprising any type of display. The machine 200 may also include other optional aspects such as an alphanumeric input device 212 (e.g., a keyboard, touch screen, and so forth), a user interface (UI) navigation device 214 (e.g., a mouse, trackball, touch device, and so forth), a storage unit 216 (e.g., disk drive or other storage device(s)), a signal generation device 218 (e.g., a speaker), sensor(s) 221 (e.g., global positioning sensor, accelerometer(s), microphone(s), camera(s), and so forth), output controller 228 (e.g., wired or wireless connection to connect and/or communicate with one or more other devices such as a universal serial bus (USB), near field communication (NFC), infrared (IR), serial/parallel bus, etc.), and a network interface device 220 (e.g., wired and/or wireless) to connect to and/or communicate over one or more networks 226.

Executable Instructions and Machine-Storage Medium

The various memories (i.e., 204, 206, and/or memory of the processor(s) 202) and/or storage unit 216 may store one or more sets of instructions and data structures (e.g., software) 224 embodying or utilized by any one or more of the methodologies or functions described herein. These instructions, when executed by processor(s) 202 cause various operations to implement the disclosed embodiments.

Example Machine Architecture and Machine-Readable Medium

FIG. 2 illustrates a representative machine architecture suitable for implementing the systems and so forth or for executing the methods disclosed herein. The machine of FIG. 2 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 2 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

As used herein, the term "network" may refer to a long-term cellular network (such as GSM (Global System for Mobile Communication) network, LTE (Long-Term Evolution) network or a CDMA (Code Division Multiple Access) network) or a short-term network (such as Bluetooth network, Wi-Fi network, NFC (near-field communication) network, LoRaWAN, ZIGBEE or Wired networks (like LAN) etc.).

As used herein, the term "computing device" may refer to a mobile phone, a personal digital assistance (PDA), a tablet, a laptop, a computer, VR Headset, Smart Glasses, projector, or any such capable device.

As used herein, the term 'electronic circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 3:
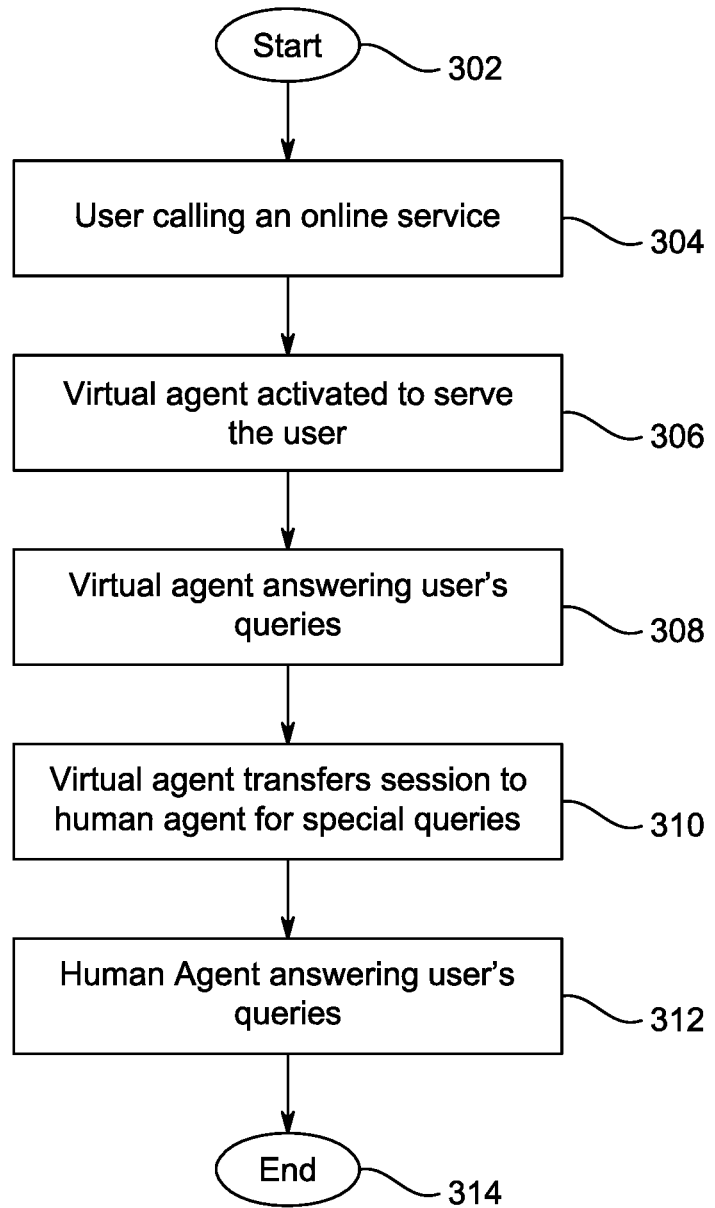
FIG. 3 shows a flow diagram of a user interaction with a virtual agent and a human agent, in accordance with an example embodiment.

FIG. 3 shows a flow diagram of a user 102 interaction with a virtual agent 106 and a human agent 104. It will be understood that each block of the flow diagram of the method 300 may be implemented by various means, such as hardware, firmware, processor, circuitry, and/or other communication devices associated with execution of software including one or more computer program instructions 224. For example, one or more of the procedures described above may be embodied by computer program instructions 224. In this regard, the computer program instructions which embody the procedures described above may be stored by a memory 204 of the system 200, employing an embodiment of the present invention and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 300 illustrated by the flowchart diagram of FIG. 3 shows a user interaction with a virtual agent and a human agent. Fewer, more, or different steps may be provided.

The method 300 starts at step 302, and at the step 304 a user calls an online service. In an embodiment, a virtual agent activated to serve the user at 306. Furthermore, at step 308 the virtual agent answers the user's queries. However, there are some special circumstances where the virtual agent is unable to answer the user's queries and the session is transferred to a human agent at step 310. The human agent ultimately answers queries at step 312 and the method 300 terminates at 314.

Figure 4:
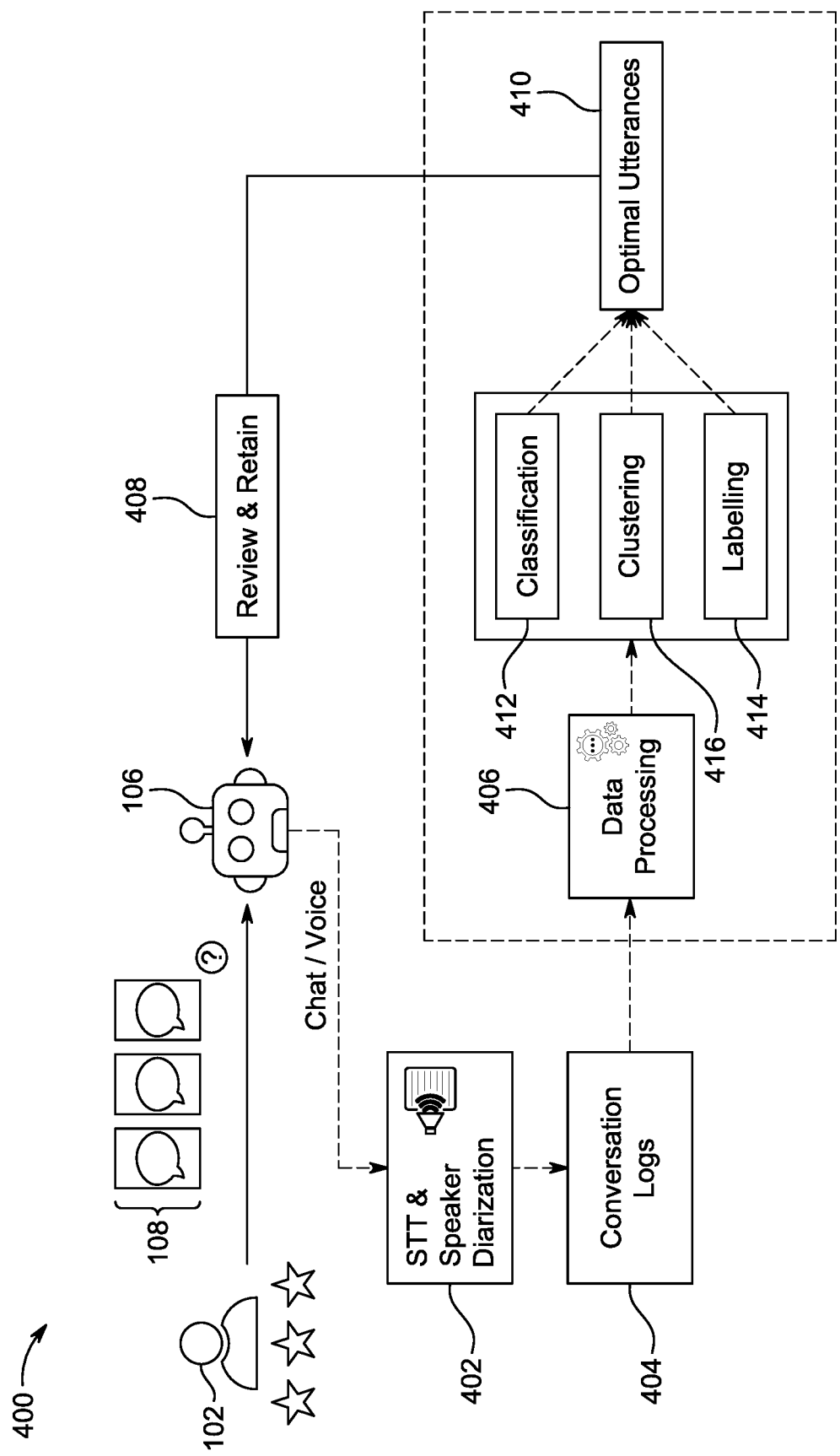
FIG. 4 illustrates a block diagram for training a virtual agent, in accordance with an example embodiment.

FIG. 4 illustrates a block diagram for training a virtual agent, consistent with embodiments of the present disclosure. The user 102 interacts with a virtual agent 106 through a medium 108. In an embodiment the medium 108 may be text or voice. Furthermore, all the interactions are diarized and if required, a speech to text module is used 402 and are stored in a conversation log 404.

In an example embodiment, diarization of speaker refers to the process of identifying and distinguishing between different speakers in an audio conversation or interaction. Diarization involves segmenting the audio signal into distinct speaker turns or segments, labeling them according to the speaker's identity, and determining when a new speaker begins talking or when a speaker switch occurs.

Virtual agents or chatbots rely on natural language processing (NLP) to understand and respond to user inputs. However, in scenarios where multiple participants are involved, such as in group discussions or meetings, speaker diarization becomes essential to accurately attribute spoken content to specific individuals.

By performing speaker diarization, a virtual agent may analyze the audio input, recognize different speakers, and associate their spoken content with respective identities. This enables the agent to provide more personalized and context-aware responses, tailor the interaction based on individual preferences or histories, and facilitate smoother multi-party conversations.

Speaker diarization algorithms typically utilize techniques such as voice activity detection (VAD) to determine when a speaker is active, speech segmentation to identify speaker boundaries, and speaker recognition or clustering algorithms to assign speakers to their respective segments. These algorithms can be trained on large amounts of audio data to improve their accuracy in distinguishing between different speakers and handling various acoustic environments.

In an example embodiment, a conversation log 404 of a virtual agent is a record or log of the interactions and exchanges that occur between the virtual agent and users. The conversation log 404 captures the sequence of messages, requests, and responses exchanged during the course of a conversation. The log contains information that helps track the flow of the conversation, understand user intents, and record the actions taken by the virtual agent.

The conversation log 404 includes the following elements:

User messages contain the messages or queries sent by the user to the virtual agent. This can include text inputs, voice commands, or any other form of user communication.

Agent responses include the replies or responses generated by the virtual agent in reaction to the user's messages. These responses can be in the form of text, voice, or other relevant formats depending on the medium of interaction.

Timestamps: Each message and response in the log is usually accompanied by a timestamp indicating when it was sent or received. Timestamps help in understanding the chronological order of the conversation and can be used for analysis or debugging purposes.

Contextual information: The log may also include contextual information that provides additional context for the conversation. This can include session IDs, user IDs, conversation IDs, or any other relevant metadata that helps identify and track specific interactions.

System actions: If the virtual agent performs any system-level actions or executes tasks on behalf of the user, such as retrieving data from a database or making API calls, those actions may be logged as well.

The conversation log serves several purposes, including:

Debugging and troubleshooting helps developers and system administrators analyze the behavior of the virtual agent, identify issues, and diagnose problems during the interaction flow.

Training and improvement: The log data can be used to train and improve the virtual agent's performance. It serves as a valuable source of data for machine learning and natural language processing techniques, enabling model training, refinement, and optimization.

Analytics and insights: By analyzing the conversation logs, valuable insights can be gained regarding user behavior, preferences, frequently asked questions, and overall system performance. This information can be used to improve user experience, identify patterns, and make data-driven decisions.

In an embodiment, a data processing 406 module extracts the interactions from the conversation logs 404 and extracts optimal utterances 410 using techniques such as classification 412, clustering 416 and labeling 414. Further a review and retrain module 408 feeds the optimal utterances 410 to the virtual agent for training.

In an embodiment, the virtual agent's trained training phrases are considered as training dataset and subsequently a classification model is created.

Further, the trained classification model is used on the extracted user utterances to infer whether these utterances can be classified as a variation of one of the trained intents which is the trained classes by the classification model. Also, user utterances, specifically the fallback utterances which are the utterances not understood by the virtual agent are used.

If amenable to classification the utterances are mapped to that intent. The mentioned steps are iterated for all the utterances.

In addition to mapping utterances, Qscore calculations are performed and ranked based on the score.

In an example embodiment, clustering 416 may be a useful technique to extract optimal training phrases from a conversation log of a virtual agent. The goal is to identify similar user queries or intents and group them together, allowing you to select representative training phrases that cover a wide range of user interactions. A general approach to using clustering for this purpose is as follows:

Data preprocessing: Prepare conversation log data by removing noise, such as irrelevant metadata or formatting inconsistencies. Clean and normalize the text, remove stopwords, and perform any other necessary preprocessing steps to ensure the data is in a suitable format for clustering.

Feature extraction: Convert the textual representation of user queries into numerical feature vectors that can be used for clustering. Common techniques for feature extraction include TF-IDF (Term Frequency-Inverse Document Frequency), word embeddings (such as Word2Vec or GloVe), or more advanced techniques like BERT embeddings. These techniques capture the semantic and contextual information within the queries.

Cluster identification: Apply a clustering algorithm, such as K-means, hierarchical clustering, or DBSCAN, to group similar queries together based on their feature representations. The choice of clustering algorithm depends on the nature of your data and the desired outcome.

Cluster analysis: Analyze the clusters obtained from the previous step to understand the patterns and identify representative queries within each cluster. Scan for clusters containing a sufficient number of instances and exhibit diversity in user intents.

Training phrase selection: Select representative training phrases from each cluster to cover a wide range of user interactions. These phrases should capture the essential intents and variations within the cluster. The user may choose a fixed number of training phrases per cluster or use a threshold based on cluster size or other criteria.

Validation and refinement: Validate the selected training phrases to ensure their quality and coverage. Evaluate against a validation set or with the help of domain experts. Refine the selection if necessary, iterating the clustering and selection process to improve the representation and coverage of user intents.

After selecting the training phrases, may be used to train or fine-tune virtual agent's natural language understanding (NLU) models, such as intent classifiers or entity recognition models. These training phrases will help the virtual agent recognize and handle similar user queries effectively In an example embodiment, classification 412 may be employed to extract optimal training phrases from a conversation log of a virtual agent. Rather than clustering, classification focuses on assigning predefined labels or categories to individual user queries. Here's a general approach to using classification for training phrase extraction:

Data preprocessing: Preprocess the conversation log data by cleaning and normalizing the text, removing noise, and handling any formatting inconsistencies. Ensure that the data is in a suitable format for classification, such as having labeled or annotated queries.

Label definition: Define a set of meaningful labels or categories that cover the different intents or topics of user queries. These labels should represent the different types of interactions or actions that the virtual agent is designed to handle. For example, if the virtual agent is a customer support bot, labels could include "Billing inquiries," "Product troubleshooting," or "Account management."

Training data creation: Manually annotate a subset of the conversation log by assigning appropriate labels to each user query. This annotated data will serve as the training set for building a classification model. Aim to create a diverse and representative training set that covers a wide range of user intents.

Feature extraction: Convert the textual representation of user queries into numerical feature vectors that can be used for classification. Common techniques include TF-IDF, word embeddings, or more advanced approaches like BERT embeddings. These features capture the semantic and contextual information within the queries.

Model training: Train a classification model using your labeled training data and the extracted features. Popular algorithms for text classification include logistic regression, support vector machines (SVM), random forests, or deep learning models like convolutional neural networks (CNN) or recurrent neural networks (RNN).

Prediction and training phrase selection: Apply the trained classification model to predict the labels for the remaining unlabeled queries in the conversation log. Review the predicted labels to identify the most representative training phrases for each category. Select a suitable number of phrases per category that cover a wide range of user intents and variations.

Validation and refinement: Validate the selected training phrases by evaluating their quality and coverage. Validate set or seek the assistance of domain experts to review the selections. Refine the process as needed, iterating on the classification model, feature extraction, or training phrase selection to improve the representation and coverage of user intents.

Once the user has the selected training phrases, the user can use the training phrases to train or fine-tune the virtual agent's NLU models, such as intent classifiers or entity recognition models. These training phrases will help the agent recognize and understand user intents more effectively.

Figure 5:
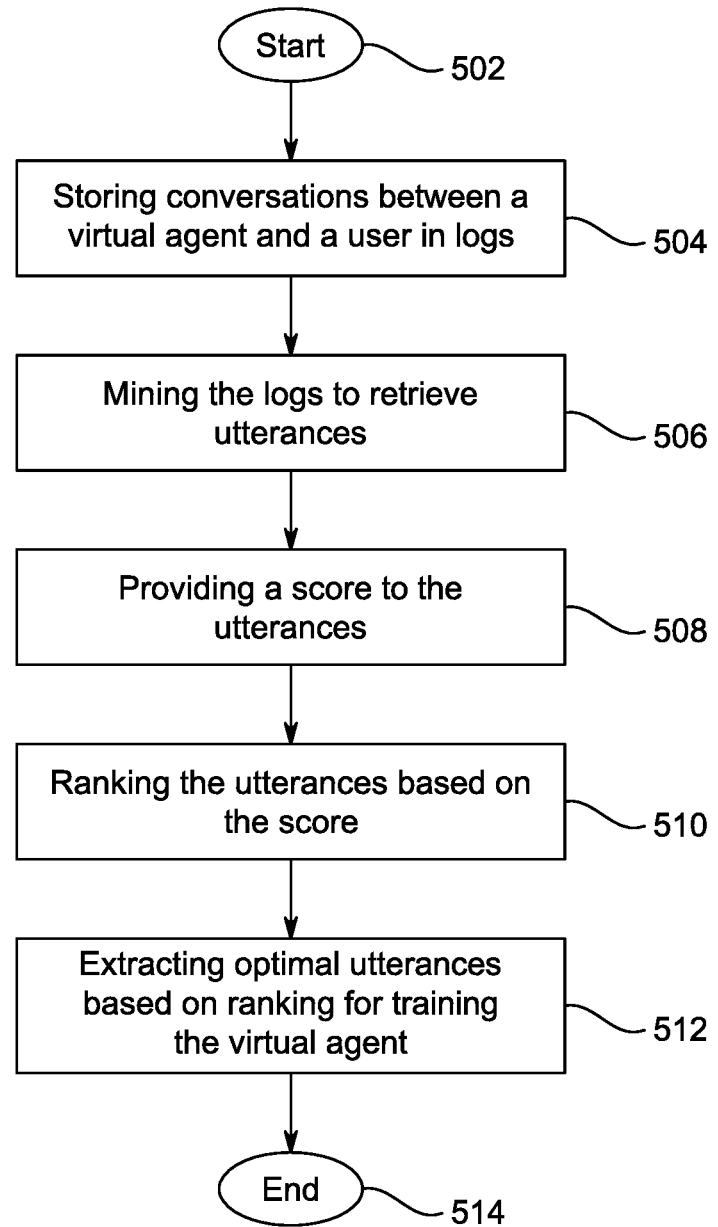
FIG. 5 shows a flow diagram of a method for training a virtual agent, in accordance with an example embodiment.

FIG. 5 illustrates a method 500 for training a virtual agent, in accordance with an example embodiment. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 500 illustrated by the flow diagram of FIG. 5 for training a virtual agent start at 502. The method 500 may include, at step 504, storing conversations between the virtual agent and a user in logs. In an example embodiment, conversations between a virtual agent and a user are typically logged using various logging mechanisms. Here are some common methods employed to log these conversations:

Text-Based Logs: One prevalent method is to log the conversations in a text-based format. Each user input and the corresponding virtual agent response is recorded in a structured manner, capturing the dialogue flow, and preserving the chronological order of the interactions. These logs can be stored in a database or a text file for later analysis and reference.

Audio or Voice Logs: In voice-based interactions, the conversations can be logged in the form of audio recordings. These recordings capture the spoken exchanges between the user and the virtual agent and can be stored as digital audio files. Voice logs are useful for understanding the nuances of spoken interactions and can be transcribed into text format for further analysis.

Metadata Logs: Apart from the actual conversation content, metadata logs can be generated to capture additional information related to the interaction. This may include timestamps indicating the date and time of each message, user identifiers, session IDs, or any other relevant contextual information that aids in understanding the context of the conversation.

System Event Logs: In some cases, system event logs are maintained to track important events or actions that occur during the conversation. These logs can include information such as the activation of specific features or modules within the virtual agent system, error messages, or any significant system-level events that affect the interaction.

User Context Logs: To provide personalized and context-aware responses, virtual agents often maintain logs of user context information. This may include user preferences, past interactions, session history, or any other relevant details that help in tailoring responses and providing a more personalized experience.

Compliance and Security Logs: In certain contexts, where compliance and security are paramount, additional logging mechanisms may be implemented. These logs capture information such as user consent, data access, or any security-related events to ensure adherence to privacy regulations and maintain system integrity.

Therefore, the specific logging methods and practices may vary depending on the implementation and requirements of the virtual agent system. The logged conversations can be leveraged for various purposes, including system analysis, training data generation, quality assurance, user experience improvement, and compliance auditing.

The method 500, at step 506, may include mining the logs to retrieve utterances. In some embodiments, mining a user and virtual agent conversation log involves extracting valuable insights, patterns, and knowledge from the logged data. Here are some techniques commonly used for mining conversation logs:

Text Analysis: Text mining techniques can be applied to extract meaningful information from the conversation log. This includes methods such as natural language processing (NLP), which can help in tasks like sentiment analysis, entity recognition, topic modelling, and keyword extraction. These techniques provide insights into user preferences, common issues, frequently discussed topics, and overall sentiment during the interactions.

Conversation Flow Analysis: Analyzing the flow of conversations helps understand the structure and dynamics of the interactions. Techniques such as sequence analysis and dialogue modeling can reveal patterns in the order and structure of user and virtual agent turns. This analysis can identify frequently occurring sequences of actions or identify areas where the conversation flow could be improved.

Intent and Entity Extraction: By applying intent and entity extraction techniques, it is possible to identify the underlying intents or goals of users' queries and extract relevant entities or key information from the conversation. This helps in understanding user needs and preferences, enabling better customization and personalization of responses.

Anomaly Detection: Anomaly detection algorithms can be employed to identify unusual or unexpected patterns in the conversation log. This can be useful for detecting outliers, potential system errors, or instances where the virtual agent may have provided incorrect or inadequate responses.

Knowledge Base Enrichment: Conversation logs can be leveraged to enhance the knowledge base or database used by the virtual agent. By analyzing user queries and the corresponding responses, new information, frequently asked questions, or missing content can be identified and used to expand and improve the knowledge base, ensuring better responses in future interactions.

User Behavior Analysis: Mining the conversation log can provide insights into user behavior, preferences, and interaction patterns. Analyzing metrics such as session duration, frequently accessed features, or common user actions can help identify areas of user interest, usability improvements, or opportunities for personalization.

Reinforcement Learning: Conversation logs can serve as valuable training data for reinforcement learning algorithms. By using the logged conversations as a reward signal, the virtual agent can learn to improve its performance and optimize its responses over time.

These techniques enable organizations to gain actionable insights from user and virtual agent conversation logs, leading to improvements in system performance, user experience, and overall effectiveness of virtual agent interactions.

The method 500, at step 508, may include providing a score (Qscore) to the utterances. In an embodiment, the scores are assigned to the utterances based on multiple criteria such as syntactic similarity, semantic similarity, word error rate and language code.

In an alternate embodiment, for extracting the most optimal utterances from a user and virtual agent call log for training the virtual agent, the below techniques may be followed:

Data Preprocessing: Preprocess the call log data by cleaning and normalizing the text. This involves removing noise, irrelevant information, or sensitive data that should not be included in the training process.

Utterance Selection Criteria: Defines criteria to determine the optimal utterances. Consider factors such as relevance, correctness, user satisfaction, and diversity. For example, the user may prioritize utterances where the virtual agent provided accurate and helpful responses, or instances where user satisfaction was high.

Filtering Techniques: Apply filtering techniques to select the most relevant utterances based on the defined criteria. This can include keyword matching, sentiment analysis, or machine learning-based classification methods to identify utterances that meet the desired criteria.

Annotation and Labeling: Annotate and label the selected utterances with appropriate tags or categories. This labeling process helps establish a ground truth and provides supervision for training the virtual agent.

Balancing and Diversifying the Dataset: Ensure a balanced representation of different user intents, topics, and scenarios within the selected utterances. This helps in training a virtual agent that can handle a wide range of user queries and provides a diverse and comprehensive understanding of user needs.

Training Data Augmentation: To augment the training data, techniques such as data synthesis, paraphrasing, or perturbation may be used. This helps in expanding the training set and introducing variations in user queries, further enhancing the virtual agent's ability to generalize and handle different inputs.

Splitting the Dataset: Divide the selected utterances into appropriate subsets for training, validation, and testing purposes. This ensures that the virtual agent is trained on a sufficient amount of data, validated on unseen examples, and tested to assess its performance accurately.

Model Training: Utilize the selected and annotated utterances to train the virtual agent model. This involves applying machine learning or deep learning techniques, such as neural networks, to learn from the labeled data and improve the virtual agent's ability to generate appropriate responses.

Iterative Feedback Loop: Continuously monitors the performance of the trained virtual agent and gather user feedback. This feedback loop helps refine the training process, identify areas of improvement, and collect additional utterances that may be included in future training iterations.

The method 500, at step 510, may include ranking the utterances based on the computed Qscore according to an essential embodiment.

In an alternate embodiment, the ranking of optimal utterances from a user and virtual agent call log may be determined using various approaches. Here are some common methods for ranking utterances:

Relevance: Utterances may be ranked based on their relevance to the user's query or the specific task at hand. This may be done by comparing the similarity between the user's query and the virtual agent's response. Techniques such as cosine similarity, semantic matching, or vector representations can be employed to measure relevance.

User Satisfaction: Utterances may be ranked based on user satisfaction metrics. This may be determined by analyzing user feedback, sentiment analysis of user responses, or post-interaction surveys. Utterances that received positive user feedback or high satisfaction ratings can be ranked higher.

Correctness or Accuracy: Utterances may be ranked based on the correctness or accuracy of the virtual agent's response. If the virtual agent provided accurate and helpful inform ad on, those utterances may be ranked higher. This may be determined by comparing the response with a ground truth or through manual review by experts.

Diversity: Utterances may be ranked to ensure diversity in the training data. This helps prevent bias and over-representation of certain topics or user intents. Ranking utterances based on their diversity metrics, such as topic coverage; can ensure a balanced representation across different domains or user scenarios.

Importance or Frequency: Utterances that address frequently asked questions or popular user queries may be ranked higher. This may be determined by analyzing the frequency of occurrence of specific user intents or by identifying commonly discussed topics.

Expert Feedback: Expert evaluation and feedback may be leveraged to rank utterances. Domain experts or human evaluators may review the utterances and assign rankings based on their judgment considering factors like accuracy, relevance, and user satisfaction.

Combination of Metrics: A combination of multiple ranking metrics can be used to assign an overall ranking score to each utterance. Weighted averages or scoring systems can be employed, considering different factors like relevance, satisfaction, correctness, diversity, or importance.

The specific method of ranking optimal utterances depends on the goals, context, and available resources. It is important to define the ranking criteria based on the desired objectives and to validate the ranking approach to ensure it aligns with the expected performance and effectiveness of the virtual agent.

The method 500 at step 512 extracts the optimal utterances based on ranking. The optimal utterances are ultimately used for training the virtual agent.

In some example embodiments, a computer programmable product may be provided. The computer programmable product may comprise at least one non-transitory computer-readable storage medium having stored thereon computer-executable program code instructions that when executed by a computer, cause the computer to execute the method 500.

In an example embodiment, an apparatus for performing the method 500 of FIG. 5 above may comprise a processor (e.g., the processor 202) configured to perform some or each of the operations of the method 500. The processor may, for example, be configured to perform the operations 502-512 by performing hardware implemented logical functions, executing stored instructions, or executing algorithms for performing each of the operations. Alternatively, the apparatus may comprise means for performing each of the operations described above. In this regard, according to an example embodiment, examples of means for performing operations (502-512) may comprise, for example, the processor 202 which may be implemented in the system 200 and/or a device or circuit for executing instructions or executing an algorithm for processing information as described above.

Figure 6:
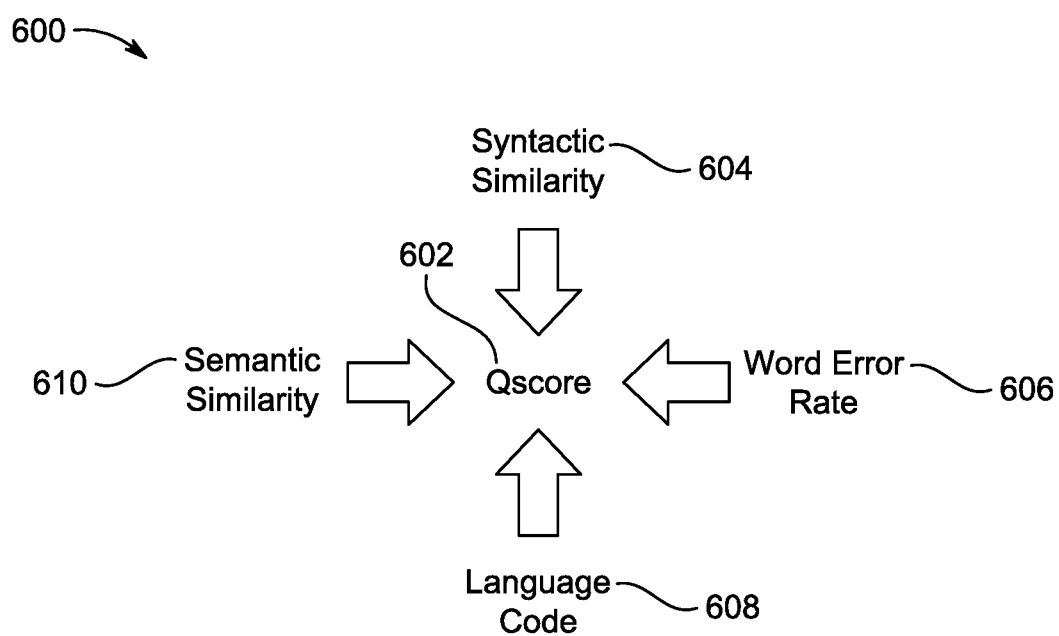
FIG. 6 illustrates a block diagram for computing Qscore, in accordance with an example embodiment.

FIG. 6, illustrates a block diagram for computing Qscore. There are multiple inputs in computing the Qscore 602. The primary inputs but is not limited to syntactic similarity 604 semantic similarity 601, word error rate 606 and language code 608.

In an embodiment, the inputs may be syntactic similarity 604, semantic similarity 601, and word error rate 606. It is to be noted that a person skilled in the art may use various combinations of the inputs.

In an example embodiment computing the syntactic similarity 604 for utterances involves comparing their structural and grammatical properties to determine their similarity. Mentioned are some example embodiments for computing syntactic Parse Tree Comparison: One method is to parse the utterances using syntactic parsers, such as constituency or dependency parsers, to obtain parse trees. Parse trees represent the grammatical structure of sentences. By comparing the parse trees of two utterances, you can assess their syntactic similarity. Techniques like tree edit distance, subtree matching, or structural alignment can be applied to quantify the similarity between parse trees.

Sequence Alignment: Another approach is to treat the utterances as sequences of words or tokens. By aligning the sequences and comparing the order and arrangement of words, you can compute syntactic similarity. Techniques like sequence alignment algorithms (e.g., Needleman-Wunsch or Smith-Waterman) or string similarity measures (e.g., Levenshtein distance or Jaccard similarity) can be used to determine the similarity between token sequences.

Dependency Structure Comparison: if dependency parse trees are available, you can compare the dependency relations between words in the utterances. By aligning the dependency relations and examining the similarity in the dependency structure, you can assess syntactic similarity. Techniques like graph matching or graph edit distance can be employed to compare and measure the similarity of dependency structures.

Part-of-Speech Tagging: Part-of-speech (POS) tagging can be performed on the utterances to identify the grammatical categories of words. By comparing the POS tags or patterns of words in the utterances, you can compute syntactic similarity. Techniques like POS sequence alignment or cosine similarity based on POS tag frequency distributions can be utilized for this purpose.

Syntactic Feature Extraction: Extracting syntactic features from the utterances can help quantify their syntactic similarity. This can involve capturing specific syntactic patterns, such as n-grams of POS tags or dependency relations, and computing similarity measures based on these features. Techniques like cosine similarity, Euclidean distance, or machine learning-based models can be employed to compute similarity using extracted features.

In an example embodiment, the choice of approach depends on the available resources (e.g., parsers, taggers) and the desired level of syntactic analysis. The complexity and accuracy of the syntactic similarity computation may vary based on the chosen technique.

In an alternate embodiment, computing semantic similarity 601 for utterances involves assessing their meaning and determining the degree of similarity or relatedness between them. Some example embodiments for computing semantic similarity:

Word Embeddings: Word embeddings are dense vector representations that capture semantic meaning. By representing words as vectors in a high-dimensional space, you can measure their similarity using distance metrics like cosine similarity or Euclidean distance. Utterances can be represented as the average or weighted sum of the word embeddings of their constituent words, and their semantic similarity can be computed based on the similarity of their embeddings.

Sentence Embeddings: Similar to word embeddings, sentence embeddings represent the meaning of entire sentences or utterances as dense vectors. Techniques like Universal Sentence Encoder, InferSent, or BERT can be used to obtain sentence embeddings. Semantic similarity between utterances can be computed by comparing the cosine similarity or Euclidean distance between their respective embeddings.

Semantic Models: Various semantic models, such as Latent Semantic Analysis (LSA) or Latent Dirichlet Allocation (MA), can be used to uncover latent semantic structures in the utterances. These models consider the co-occurrence or contextual information of words to capture their underlying semantic relationships. Semantic similarity can be computed based on the similarity of the inferred latent semantic representations of the utterances.

Knowledge-based Approaches: Knowledge bases like WordNet or ConceptNet provide semantic relations between words or concepts. Utterances can be represented as sets of concepts or semantic features extracted from the text. Similarity between utterances can be computed based on the overlap or relatedness of the concepts or semantic features they contain.

Deep Learning Models: Deep learning models, such as Siamese networks or convolutional neural networks (CNN), can be trained to directly measure the semantic similarity between utterances. These models learn to encode the semantic meaning of utterances and compute a similarity score based on their learned representations. Training data with pairs of utterances and their corresponding similarity labels is required to train such models.

Distributional Similarity: Distributional similarity measures the similarity between utterances based on the distributional properties of words or phrases in a large corpus of text. Techniques like distributional semantic models, co-occurrence matrices, or term frequency-inverse document frequency (TF-IDF) can be used to compute semantic similarity based on the distributional properties of utterances.

In another example embodiment, combining multiple approaches or leveraging ensemble techniques may also improve the robustness and accuracy of semantic similarity computation.

In an alternate embodiment Word Error Rate (WER) 606 is typically computed to measure the accuracy of Automatic Speech Recognition (ASR) and chat systems. WER quantifies the discrepancy between the recognized text and the reference (ground truth) text. When considering utterances, WER is computed by comparing the words in the recognized utterance with the words in the reference utterance. In an embodiment, the process for computing WER is as follows:

Preprocessing: Preprocess the recognized and reference utterances by removing punctuation, converting text to lowercase, and handling any specific requirements based on the ASR system or evaluation setup.

Tokenization: Tokenize both the recognized and reference utterances into individual words. This step splits the utterances into a sequence of word tokens for comparison.

Alignment: Align the word tokens between the recognized and reference utterances. This step aligns the words based on their position to identify matching, substitution, insertion, and deletion errors. Various alignment algorithms, such as dynamic programming, can be employed for this purpose.

Error Calculation: Calculate the number of errors between the recognized and reference utterances. Errors are classified into four categories:

Substitution: When a word in the recognized utterance is different from the corresponding word in the reference utterance.

Insertion: When an extra word is present in the recognized utterance but not in the reference utterance.

Deletion: When a word is missing in the recognized utterance compared to the reference utterance.

Matching: When a word in the recognized utterance matches exactly with the corresponding word in the reference utterance.

WER Computation: Calculate the WER by dividing the total number of errors (substitution, insertion, and deletion) by the total number of words in the reference utterance. The result is usually expressed as a percentage.

$$WER=(Substitution+Insertion+Deletion)/Total\ Words\ in\ the\ Reference\ Utterance*100$$

WER provides a measure of the accuracy of the ASR system by quantifying the errors made in recognizing the utterance compared to the ground truth. WER is a widely used metric for evaluating and benchmarking ASR and virtual agent systems.

In an example embodiment, language codes 608 are useful in scoring multilingual utterances as they provide information about the language in which the utterance is expressed. They help in distinguishing and handling utterances from different languages appropriately during scoring or evaluation. In some example embodiments, language codes can be used as follows:

Language-specific Scoring: Language codes allow for language-specific scoring or evaluation of utterances. Different languages may have different linguistic characteristics, vocabularies, or grammatical structures. By considering the language code, scoring mechanisms can be tailored to account for language-specific nuances and improve accuracy in assessing the quality or relevance of the utterance.

Language-specific Models: Language codes can be used to determine which language-specific models or resources should be applied during scoring. Multilingual systems may have separate models or components for different languages, such as language-specific ASR or NLP models. The language code helps in selecting the appropriate model for scoring the utterance accurately.

Language-based Weighting: Language codes can be used to assign weights or importance levels based on the target language or desired language-specific objectives. For example, in a multilingual dialogue system, the importance of different languages may vary based on user demographics or business priorities.

Language-specific Features: in an alternate embodiment, language codes can be used to extract or incorporate language-specific features into the scoring process. Different languages may have distinct features or patterns that affect the quality or relevance of the utterance. By incorporating language-specific features into the scoring mechanism, the evaluation can capture the unique characteristics of each language and produce more accurate scores.

Language-aware Error Analysis: Language codes facilitate language-aware error analysis, allowing for targeted improvements in the scoring or evaluation process. By analyzing errors or discrepancies in different languages separately, it becomes easier to identify language-specific challenges, gaps in language resources, or areas where the scoring mechanism may need refinement.

Language codes provide a crucial piece of information that enables the scoring or evaluation process to handle multilingual utterances effectively. Further, language codes help in applying language-specific approaches, selecting appropriate models or resources, and considering language-specific factors to achieve accurate and meaningful scoring outcomes.

Figure 7:
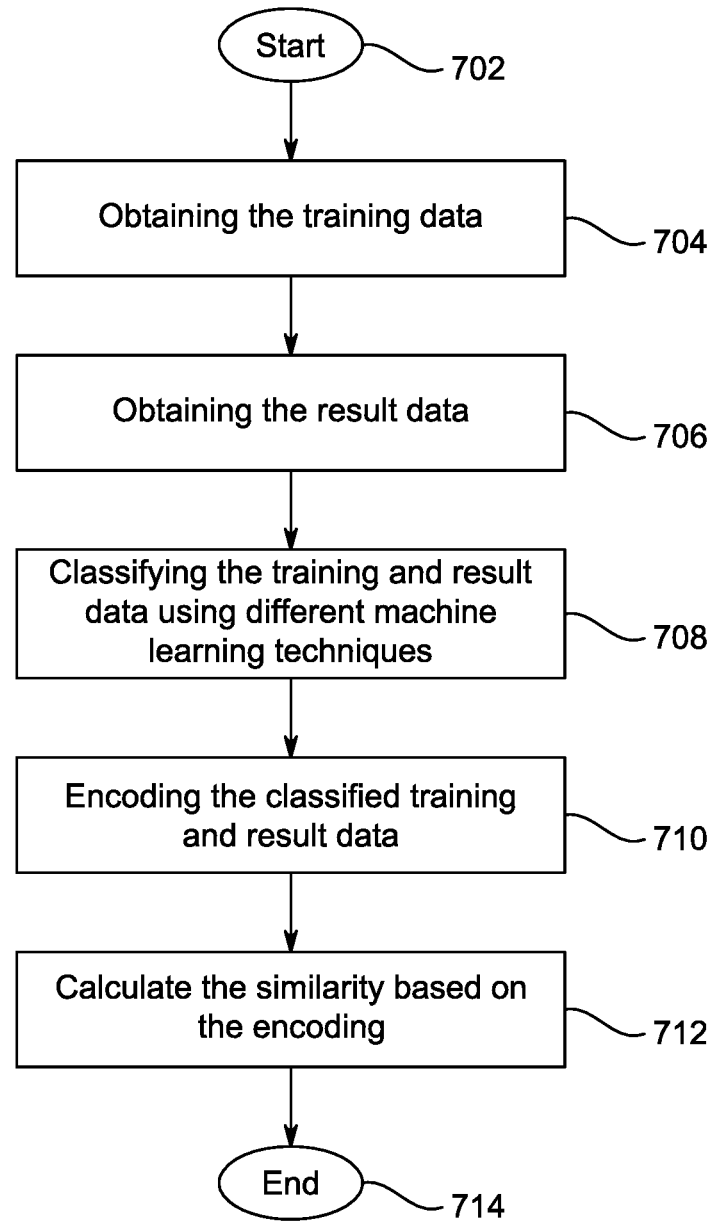
FIG. 7 shows a flow diagram of a method for computing semantic similarity, in accordance with an example embodiment.

FIG. 7 shows a flow diagram of a method 700 for computing semantic similarity, in accordance with an example embodiment. It will be understood that each block of the flow diagram of the method 300 may be implemented by various means, such as hardware, firmware, processor, circuitry, and/or other communication devices associated with execution of software including one or more computer program instructions 224. For example, one or more of the procedures described above may be embodied by computer program instructions 224. In this regard, the computer program instructions which embody the procedures described above may be stored by a memory 204 of the system 200, employing an embodiment of the present invention and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hard ware-based computer systems which perform the specified functions, or combinations of special purpose hardware and computer instructions. The method 700 illustrated by the flowchart diagram of FIG. 7 shows a method for computing semantic similarity. Fewer, more, or different steps may be provided.

The method 700 starting at 702 commences by obtaining training data 704 and result data 706.

In an embodiment, the method 700 classifies the training and result data using various machine learning 708 techniques. In an alternate embodiment, deep learning techniques may be utilized for classifying training and result data by the following steps:

Data Preparation: Preprocess and prepare the training and result data for classification. This involves tasks such as data cleaning, normalization, tokenization, and feature extraction. Ensure that the data is in a suitable format and representation for input to deep learning models.

Data Split: Split the prepared data into training and validation/test sets. The training set is used to train the deep learning model, while the validation/test set is used to evaluate its performance.

Model Selection: Choose an appropriate deep learning model architecture for the classification task. This depends on the nature of the data, such as image data (CNN), text data (RNN, Transformer), or tabular data (DNN).

Model Design and Training: Design the deep learning model by defining the architecture, including the layers, activation functions, and connections. Train the model using the training data, optimizing a suitable loss function with an optimization algorithm such as gradient descent. This involves feeding the training data through the model iteratively, adjusting the model's parameters to minimize the loss and improve classification accuracy.

Hyperparameter Tuning: Fine-tune the hyperparameters of the deep learning model to optimize its performance. This includes parameters like learning rate, batch size, number of layers, and activation functions. Perform experimentation and validation on the validation/test set to select the best hyperparameters that yield the highest classification accuracy.

Model Evaluation: Evaluate the trained deep learning model using the validation/test set. Calculate metrics such as accuracy, precision, recall, F1 score, or area under the ROC curve to assess its performance. This helps understand the model's effectiveness in classifying the training and result data.

Model Deployment: Once satisfied with the model's performance, deploy it to classify new, unseen data. Provide the necessary input data to the deployed model, and it will predict the corresponding classes or labels for the given data.

Iterative Refinement: Continuously monitor and refine the model's performance. Collect feedback from users or experts, analyze misclassifications, and iterate on the model design, training process, or data pre-processing to improve classification accuracy.

Deep learning techniques offer powerful tools for classifying training and result data across various domains. However, the specifics of the implementation, model architecture, and data pre-processing depend on the specific problem, data characteristics, and available resources. Experimentation and fine-tuning are crucial to achieve the best classification performance with deep learning models. Further the method 700, may encode the classified training and result data at step 710. The similarity score is calculated based on the encoding at step 712.

In some example embodiments, a computer programmable product may be provided. The computer programmable product may comprise at least one non-transitory computer-readable storage medium having stored thereon computer-executable program code instructions that when executed by a computer, cause the computer to execute the method 700.

In an example embodiment, an apparatus for performing the method 700 of FIG. 7 above may comprise a processor (e.g., the processor 202) configured to perform some or each of the operations of the method 700. The processor may, for example, be configured to perform the operations (702-712) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (702-712) may comprise, for example, the processor 202 which may be implemented in the system 200 and/or a device or circuit for executing instructions or executing an algorithm for processing information as described above.

Figure 8:
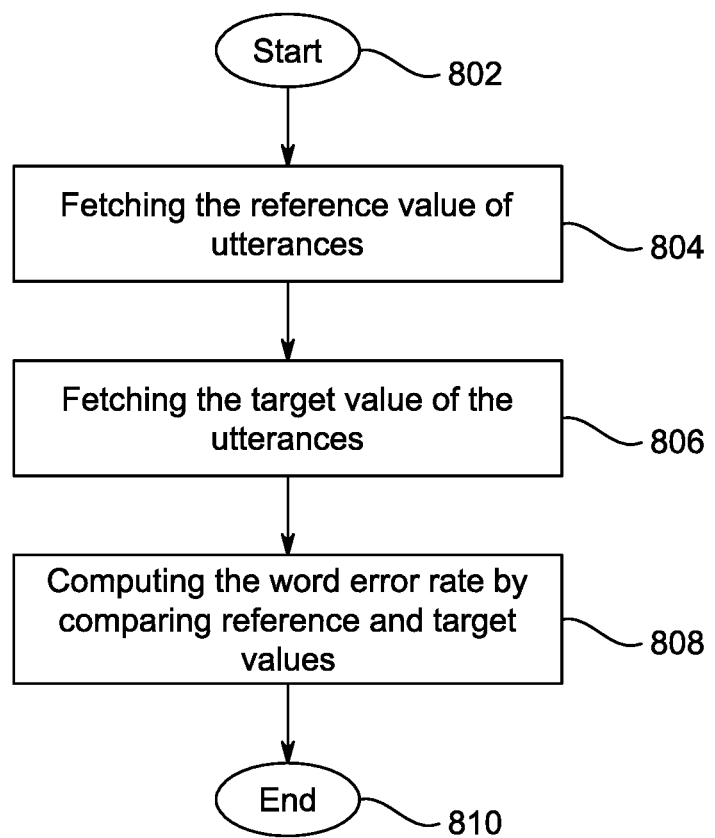
FIG. 8 shows a flow diagram of a method for computing word error rate, in accordance with an example embodiment.

FIG. 8 illustrates a method 800 for computing word error rate, in accordance with an example embodiment. It will be understood that each block of the flow diagram of the method 800 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 800 illustrated by the flow diagram of FIG. 500 for computing word error rate starts at step 802. The method 800 may include, at step 804, fetching the reference value of utterances and at step 806 the target value of the utterances.

The method 800, at step 808, may include computing the word error rate by comparing reference and target values in an embodiment.

In an alternate embodiment, Word Error Rate (WER) 606 is computed to measure the accuracy of Automatic Speech Recognition (ASR) and chat systems. WER quantifies the discrepancy between the recognized text and the reference (ground truth) text. When considering utterances, WER is computed by comparing the words in the recognized utterance with the words in the reference utterance. In an embodiment, the process for computing WER is as follows:

Preprocessing: Preprocess the recognized and reference utterances by removing punctuation, converting text to lowercase, and handling any specific requirements based on the ASR system or evaluation setup.

Tokenization: Tokenize both the recognized and reference utterances into individual words. This step splits the utterances into a sequence of word tokens for comparison.

Alignment: Align the word tokens between the recognized and reference utterances. This step aligns the words based on their position to identify matching, substitution, insertion, and deletion errors. Various alignment algorithms, such as dynamic programming, can be employed for this purpose.

Error Calculation: Calculate the number of errors between the recognized and reference utterances. Errors are classified into four categories:

Substitution: When a word in the recognized utterance is different from the corresponding word in the reference utterance.

Insertion: When an extra word is present in the recognized utterance but not in the reference utterance.

Deletion: When a word is missing in the recognized utterance compared to the reference utterance.

Matching: When a word in the recognized utterance matches exactly with the corresponding word in the reference utterance.

WER Computation: Calculate the WER by dividing the total number of errors (substitution, insertion, and deletion) by the total number of words in the reference utterance. The result is usually expressed as a percentage.

WER=(Substitution+Insertion+Deletion)/Total Words in the Reference Utterance*100

In some example embodiments, a computer programmable product may be provided. The computer programmable product may comprise at least one non-transitory computer-readable storage medium having stored thereon computer-executable program code instructions that when executed by a computer, cause the computer to execute the method 800.

In an example embodiment, an apparatus for performing the method 800 of FIG. 8 above may comprise a processor (e.g., the processor 202) configured to perform some or each of the operations of the method 800. The processor may, for example, be configured to perform the operations (802-810) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (802-810) may comprise, for example, the processor 202 which may be implemented in the system 200 and/or a device or circuit for executing instructions or executing an algorithm for processing information as described above.

Figure 9:
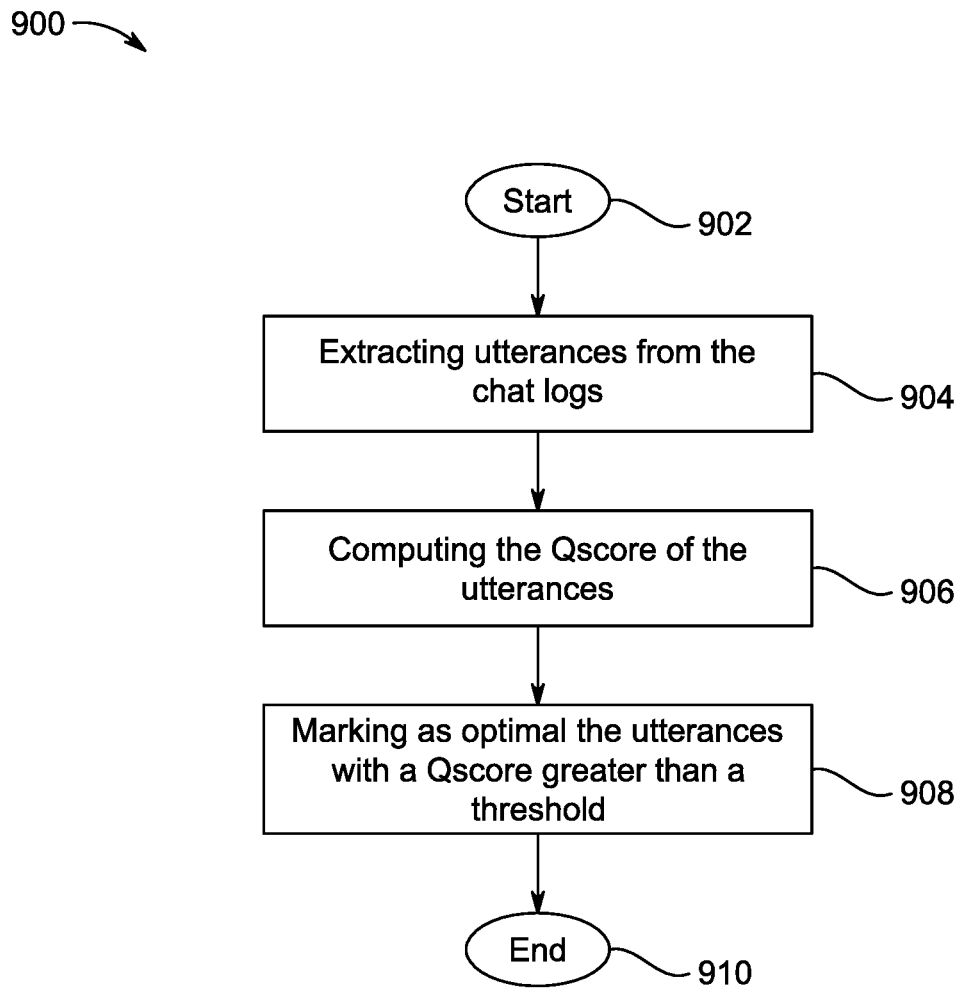
FIG. 9 shows a flow diagram of a method for extracting optimal utterances, in accordance with an example embodiment.

FIG. 9 illustrates a method 900 for computing extracting optimal utterances, in accordance with an example embodiment. It will be understood that each block of the flow diagram of the method 900 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 900 illustrated by the flow diagram of FIG. 9 for extracting optimal utterances may include, at step 904, extracting utterances from the chat logs.

The method 900, at step 906, may include computing Qscore 602 of the utterances. For computing the Qscore the primary inputs are syntactic similarity 604, semantic similarity 601, word error rate 606 and language code 608 a person skilled in the art would understand that the mentioned inputs are not to be construed as limiting. In an embodiment the mentioned inputs are combined in different weightages to obtain the Qscore.

The method 900, at step 908 may mark utterances with Qscores greater than a first threshold and lesser than a second threshold as optimal. In an embodiment, the first threshold is 70% and the second threshold is 80%.

In some example embodiments, a computer programmable product may be provided. The computer programmable product may comprise at least one non-transitory computer-readable storage medium having stored thereon computer-executable program code instructions that when executed by a computer, cause the computer to execute the method 900.

In an example embodiment, an apparatus for performing the method 900 of FIG. 9 above may comprise a processor (e.g., the processor 202) configured to perform some or each of the operations of the method 1600. The processor may, for example, be configured to perform the operations (902-910) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (902-910) may comprise, for example, the processor 202 which may be implemented in the system 200 and/or a device or circuit for executing instructions or executing an algorithm for processing information as described above.

Figure 10:
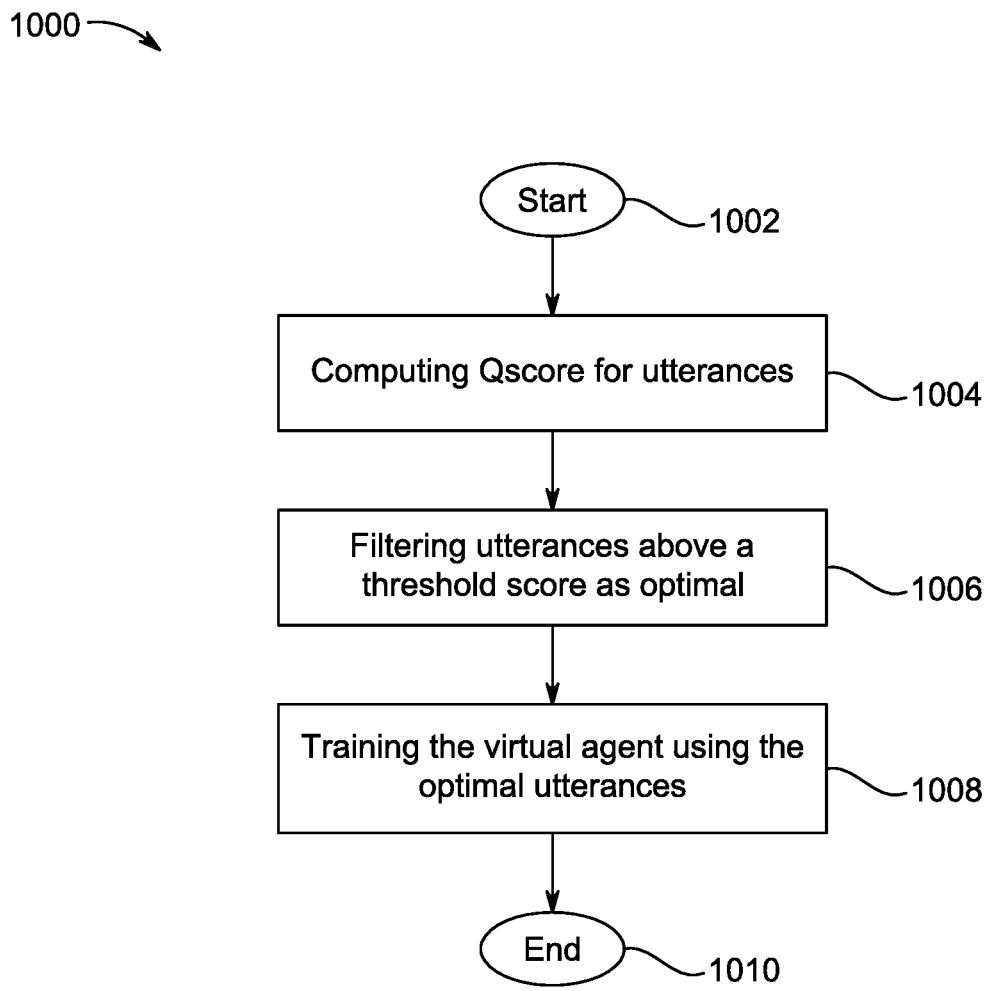
FIG. 10 shows a flow diagram of a method for using optimal utterances to train a virtual agent, in accordance with an example embodiment.

FIG. 10 illustrates a method 1000 for using optimal utterances to train a virtual agent, in accordance with an example embodiment. It will be understood that each block of the flow diagram of the method 1000 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 1000 illustrated by the flow diagram of FIG. 10 for using optimal utterances to train a virtual agent may include, at step 1004, computing Qscore for utterances. For computing the Qscore the primary inputs are syntactic similarity 604, semantic similarity 601, word error rate 606 and language code 608 a person skilled in the art would understand that the mentioned inputs are not to be construed as limiting. In an embodiment the mentioned inputs are combined in different weightages to obtain the Qscore.

The method 1000, at step 1006 may filter utterances with Qscores greater than a first threshold and lesser than a second threshold as optimal. In an embodiment, the first threshold is 70% and the second threshold is 80%.

The method 1000, at step 1008, may include training a virtual agent using the optimal utterances.

In some example embodiments, a computer programmable product may be provided. The computer programmable product may comprise at least one non-transitory computer-readable storage medium having stored thereon computer-executable program code instructions that when executed by a computer, cause the computer to execute the method 1000.

In an example embodiment, an apparatus for performing the method 1000 of FIG. 10 above may comprise a processor (e.g., the processor 202) configured to perform some or each of the operations of the method 1000. The processor may, for example, be configured to perform the operations (1002-1010) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (1002-1010) may comprise, for example, the processor 202 which may be implemented in the system 200 and/or a device or circuit for executing instructions or executing an algorithm for processing information as described above.

Figure 11:
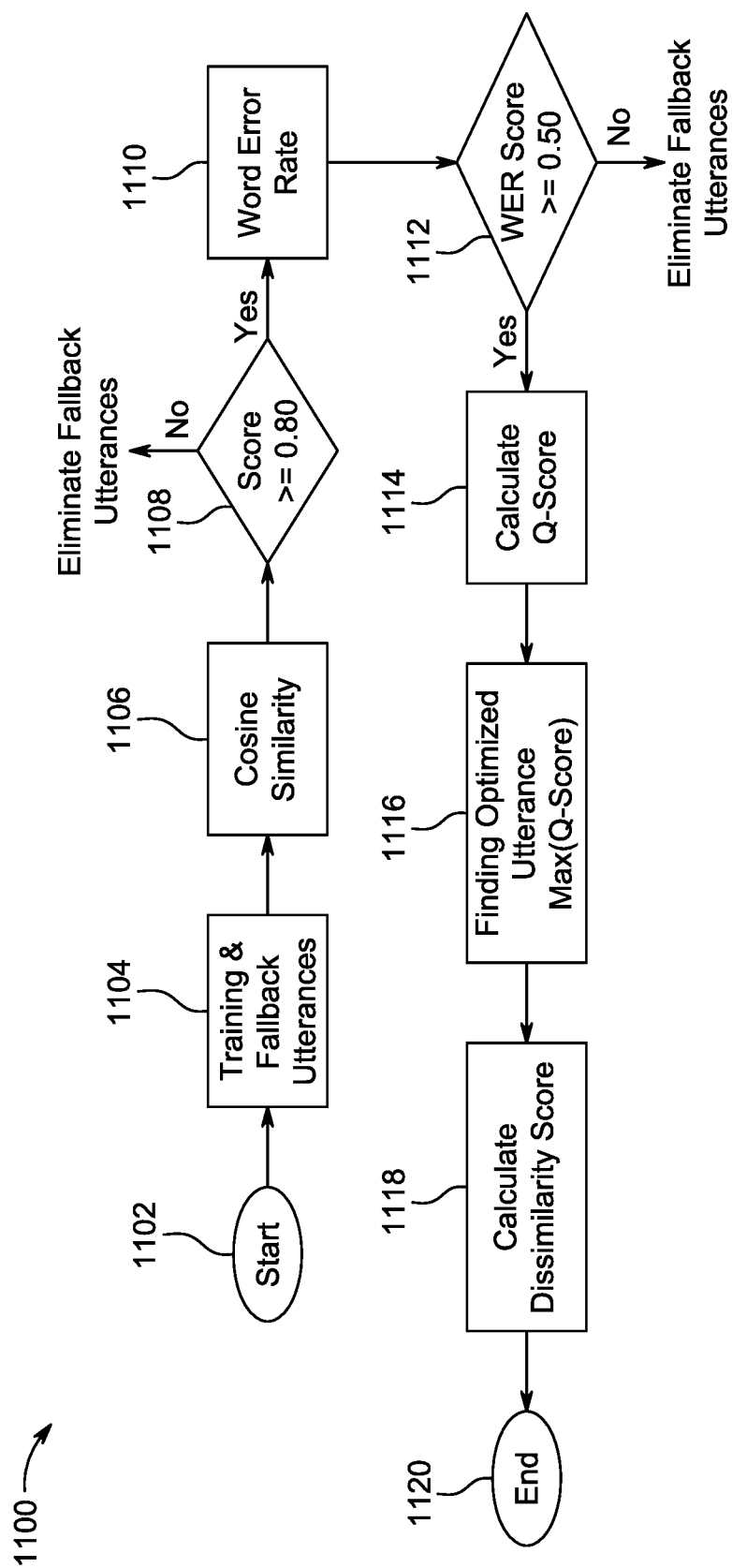
FIG. 11 shows a flow diagram of overall operation, in accordance with an example embodiment.

FIG. 11 shows a flow diagram of overall operation, in accordance with an example embodiment. The method 1100 starting 1102 is initially involved in training and fallback utterances at step 1104.

Further, at step 1106 cosine similarity is computed for the utterances. In an embodiment, cosine similarity is a widely used measure to determine the similarity between two vectors in a multi-dimensional space. It is particularly useful in natural language processing (NLP) and information retrieval tasks. Cosine similarity quantifies the similarity between two vectors by calculating the cosine of the angle between them, hence its name.

In an alternate embodiment, Euclidean distance, which calculates the straight-line distance between two vectors in the multi-dimensional space.

Another alternative is Jaccard similarity, which is commonly used for comparing sets. Jaccard similarity measures the intersection over the union of two sets. In the context of text analysis, each set can represent the unique terms or features present in a document.

Additionally, there are other similarity measures tailored to specific tasks and data structures. For example, the Pearson correlation coefficient is commonly used to measure the linear relationship between two variables, often applied in recommendation systems. In graph analysis, measures like the Jaccard index and the Sorensen-Dice coefficient are used to assess similarity between nodes or subgraphs.

At step 110 if the cosine similarity is less than a threshold the fallback utterances are eliminated else step 1110 which computes the WER is executed. In an embodiment, the threshold for cosine score may be 0.8.

In case at step 1112 if the WER is less than a limit then the fallback utterances are eliminated else proceed to step 1114 which calculates the Qscore. The optimized utterance is selected at step 1116 for utterance with maximum Qscore.

At the ultimate step 1118 dissimilarity score is computed and the method terminates at 1120.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

It is to be understood that the above description is intended to be illustrative, and not restrictive. For example, the above-discussed embodiments may be used in combination with each other. Many other embodiments will be apparent to those of skill in the art upon reviewing the above description.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention.

What is claimed is:

1. A computer-implemented method for training a virtual agent, comprising:
    storing conversations between the virtual agent and a user in logs;
    mining the logs to retrieve utterances;
    assigning a score to each of the utterances;
    ranking the utterances based on the assigned scores; and
    determining one or more of the ranked utterances as optimal based on a threshold score wherein the determining the one or more of the ranked utterances as optimal based on the threshold score comprises marking utterances with scores greater than a first threshold and lesser than a second threshold as optimal.

2. The computer-implemented method of claim 1, wherein the score is calculated based on syntactic similarity.

3. The computer-implemented method of claim 1, wherein the score is calculated based on semantic similarity.

4. The computer-implemented method of claim 3, further comprising calculating the semantic similarity using a deep learning model.

5. The computer-implemented method of claim 1, wherein the score is calculated based on word error rate.

6. The method of claim 1, wherein the score is calculated based on language code for a multilingual chat.

7. The computer-implemented method of claim 1, further comprising extracting the one or more optimal utterances based on the ranking the utterances.

8. The computer-implemented method of claim 7, further comprising training the virtual agent based on the one or more optimal utterances.

9. A computer system for training a virtual agent, the computer system comprising:
    one or more computer processors, one or more computer readable memories, one or more computer readable storage devices, and program instructions stored on the one or more computer readable storage devices for execution by the one or more computer processors via the one or more computer readable memories, the program instructions comprising:
    storing conversations between the virtual agent and a user in logs;
    mining the logs to retrieve utterances;
    assigning a score to each of the utterances;
    ranking the utterances based on the assigned scores; and
    determining one or more of the ranked utterances as optimal based on a threshold score wherein the determining the one or more of the ranked utterances as optimal based on the threshold score comprises marking utterances with scores greater than a first threshold and lesser than a second threshold as optimal.

10. The computer system of claim 9, wherein the score is calculated based syntactic similarity.

11. The computer system of claim 9, wherein the score is calculated based on semantic similarity.

12. The computer system of claim 11, further comprising calculating the semantic similarity using a deep learning model.

13. The computer system of claim 9, wherein the score is calculated based on word error rate.

14. The computer system of claim 9, wherein the score is calculated based on language code for a multilingual chat.

15. The computer system of claim 9, further comprising extracting the one or more optimal utterances based on the ranking the utterances.

16. The computer system of claim 15, further comprising training the virtual agent based on the one or more optimal utterances.

17. A non-transitory computer-readable storage medium having stored thereon computer executable instructions which, when executed by one or more processors, cause the one or more processors to carry out operations for training a virtual agent, the operations comprising:
    storing conversations between the virtual agent and a user in logs;
    mining the logs to retrieve utterances;
    assigning a score to each of the utterances;
    ranking the utterances based on the assigned scores; and
    determining one or more of the ranked utterances as optimal based on a threshold score wherein the determining the one or more of the ranked utterances as optimal based on the threshold score comprises marking utterances with scores greater than a first threshold and lesser than a second threshold as optimal.

* * * * *